(12) United States Patent
Bathelet

(10) Patent No.: US 8,288,700 B2
(45) Date of Patent: Oct. 16, 2012

(54) PROCESS AND INSTALLATION FOR THE HOT MARKING OF TRANSLUCENT OR TRANSPARENT OBJECTS LEAVING A FORMING MACHINE

(75) Inventor: Guillaume Bathelet, Marcy l'Etoile (FR)

(73) Assignee: Tiama, Vourles (FR)

( * ) Notice: Subject to any disclaimer, the term of this patent is extended or adjusted under 35 U.S.C. 154(b) by 584 days.

(21) Appl. No.: 12/311,902

(22) PCT Filed: Oct. 18, 2007

(86) PCT No.: PCT/FR2007/052196
§ 371 (c)(1),
(2), (4) Date: Nov. 20, 2009

(87) PCT Pub. No.: WO2008/047058
PCT Pub. Date: Apr. 24, 2008

(65) Prior Publication Data
US 2010/0102032 A1    Apr. 29, 2010

(30) Foreign Application Priority Data
Oct. 18, 2006    (FR) ..................................... 06 54340

(51) Int. Cl.
*G02B 7/04*    (2006.01)
(52) U.S. Cl. ..................................... 250/201.2; 250/221

(58) Field of Classification Search .................. 250/221, 250/201.2–201.4, 559.4–559.44; 219/121.68–121.83; 347/224–248
See application file for complete search history.

(56) References Cited

U.S. PATENT DOCUMENTS

| 4,870,922 | A | 10/1989 | Robertson | |
| 5,734,412 | A * | 3/1998 | Hasebe et al. | 347/247 |
| 2003/0052100 | A1 | 3/2003 | Philipp et al. | |

FOREIGN PATENT DOCUMENTS

| EP | 0495647 | 7/1992 |
| FR | 9-128578 | 5/1997 |
| FR | 2859199 | 3/2005 |
| WO | 2004/000749 | 12/2003 |

* cited by examiner

*Primary Examiner* — Que T Le
(74) *Attorney, Agent, or Firm* — Clark & Brody

(57) ABSTRACT

An installation for marking, at the exit of a forming machine (3), transparent or translucent objects running horizontally, in succession, in front of a marking station (7) comprises a device (9) for producing a laser beam to ensure marking of the objects. The installation includes a camera for determining the position of each of the objects along at least one direction transverse to the running direction (D) of the objects, the camera upstream of the marking station relative to the running direction. The focusing plane of the laser beam is displaced along a transverse direction relative to the running direction (D) with a guide driving the displacement means and connected to the camera to make it possible to adjust the focusing plane of the laser beam in order to optimize the marking of the objects by the laser beam.

18 Claims, 2 Drawing Sheets

PROCESS AND INSTALLATION FOR THE HOT MARKING OF TRANSLUCENT OR TRANSPARENT OBJECTS LEAVING A FORMING MACHINE

The present invention relates to the technical area of marking translucent or transparent objects at hot temperature.

The object of the invention more precisely concerns the hot marking of hollow objects, at fast production rate, such as glass bottles or flasks leaving a manufacturing or forming machine.

In the preferred area of the production of glass objects, it is known to use marking systems, either at the exit of the forming machine or in the cold part of the manufacturing process, for time-stamping purposes to ensure the traceability of production.

Conventionally, a forming machine consists of different cavities each equipped with a mould in which the object assumes its final shape at high temperature. On leaving the forming machine, the objects are conveyed in a line on a conveyor causing the objects successively to pass in front of various processing stations such as spraying and annealing.

It would be of interest to mark the objects as soon as possible after they leave the forming machine so as not to avoid any time shift in the detection of defects which may appear subsequent to accumulation of objects or traceability errors.

In the prior art, various solutions were put forward to mark objects at high temperature after leaving the forming machine. For example U.S. Pat. No. 4,870,922 describes a marking machine which marks by controlled spraying of a fluid. The marking head is arranged along the conveyor bringing the objects from the forming machine. In practice, the fluid deposited on the surface in the form of a code or a mark proves to become deteriorated or even deleted during handling, filling or washing operations of the glass articles, which are inherent in the glass-making process.

To solve the problems connected with the resistance of the code or mark over time, it is known from document JP 09 128 578 in particular, to use a laser marking system which imprints marks or codes on the surface of the items, by ablation or melting of the glass. The advantage of this technology lies in the fact that the code is indelible and shows great resistance to handling, filling or washing operations inherent in the glass-making process.

This laser marking technique is also known for its use in the cold part of the manufacturing process of glass objects. Document EP 0 495 647 for example describes an installation adapted to calculate the speed of travel of the objects so as to ensure corresponding marking of the objects. Similarly, documents WO 2004/000749 and US 2003/052100 detect the position of the object of the invention according to its direction of travel, before conducting a marking operation on the object.

However, these laser marking techniques have the disadvantage that they are unable to provide reliable efficient ablation or melting of the glass. It has been ascertained that the laser does not have sufficient power to melt the glass, taking into account the fact that the objects do not always lie in the focusing plane of the laser.

It can be envisaged to align the objects leaving the forming mould using mechanisms to position the articles in line on a conveyor since, when leaving the forming machine, the articles slide and are never perfectly aligned. The use of guides to align the objects may cause defects through contact with the guides or by generating contact between the glass objects when their movement is slowed on the conveyor. When these objects are at high temperature, such contacts generate defects since high-temperature glass can still be deformed.

The object of the invention is therefore to overcome the disadvantages of the prior art by proposing an installation adapted to ensure the efficient laser marking of objects leaving the forming machine, whilst avoiding the risk of deteriorating the objects during their conveying as far as the marking station.

To achieve this objective, the object of the invention is an installation to mark transparent or translucent objects leaving the forming machine which successively travel in translation in front of a marking station comprising:
  apparatus to produce a laser beam to ensure marking of the objects,
  means to determine the position of each of the objects in at least one direction transverse to the direction of travel of the objects, these means being positioned upstream of the marking station relative to the direction of travel,
  means to move the focusing plane of the laser beam, in a transverse direction relative to the direction of travel,
  means to guide the moving means linked to the determining means which, in relation to the position of each object to be marked, allow the focusing plane of the laser beam to be adapted to optimize marking of the objects by the laser beam.

With said installation it is possible to avoid using any positioning mechanism at the exit of the forming machine whilst optimizing the laser marking process.

Another drawback of the prior art lies in the fact that the marking operation does not allow reliable encoding of the mould number on each object having regard to errors in traceability due to accumulations, for example, or to breakages.

The present invention therefore sets out to overcome this drawback by proposing a technique for the reliable marking, on each object, of data related to the forming cavity of each of said objects.

To achieve this objective, the installation comprises synchronizing means with a forming machine, linked to the marking station so as to apply marking to each object, which gives at least one data item related to the forming cavity of each of the objects.

According to one example of embodiment, the marking station applies marking to each object giving at least one data item on the mould number or originating forming cavity.

According to another example of embodiment, the marking station produces a marking on each object giving at least one time information on the time of formation of the objects.

According to another example of embodiment, the marking station produces a marking on each object giving at least one item of information on the forming machine, the production line and/or the production factory.

According to another example of embodiment, the marking station produces a marking on each object giving a unique identification to each of the objects.

For example, the means to determine the position of the objects are optical means.

A further object of the invention is to propose a marking method using a laser beam at the exit of a forming machine, to mark transparent or translucent objects successively travelling in translation in front of a marking station. The method comprises the following steps:
  determining, before their marking, the position of each object in at least one transverse direction relative to the direction of travel of the objects, moving the focusing plane of the laser beam in the transverse direction relative to the position of these objects to be marked, to optimize the subsequent marking operation of the objects travelling in front of the laser beam, producing a marking on each object by means of the laser beam whose focusing plane has been optimally positioned to ensure marking.

According to one advantageous characteristic of embodiment, the method consists of producing a marking on each object based on at least one of the following data items: mould number or originating cavity, forming machine, production line, production factory, date of manufacture.

According to one preferred characteristic of embodiment, the method consists of producing a marking on each object giving a unique identification for each object.

Advantageously the method consists of producing a marking on each object based on at least one of the following data items: mould number or originating cavity, forming machine, production line, production factory, date of manufacture.

For example, the method consists of producing coded marking on each object.

Various other characteristics will become apparent from the description given below with reference to the appended drawings which, as non-limiting examples, illustrate forms of embodiment of the object of the invention.

Figure 1:
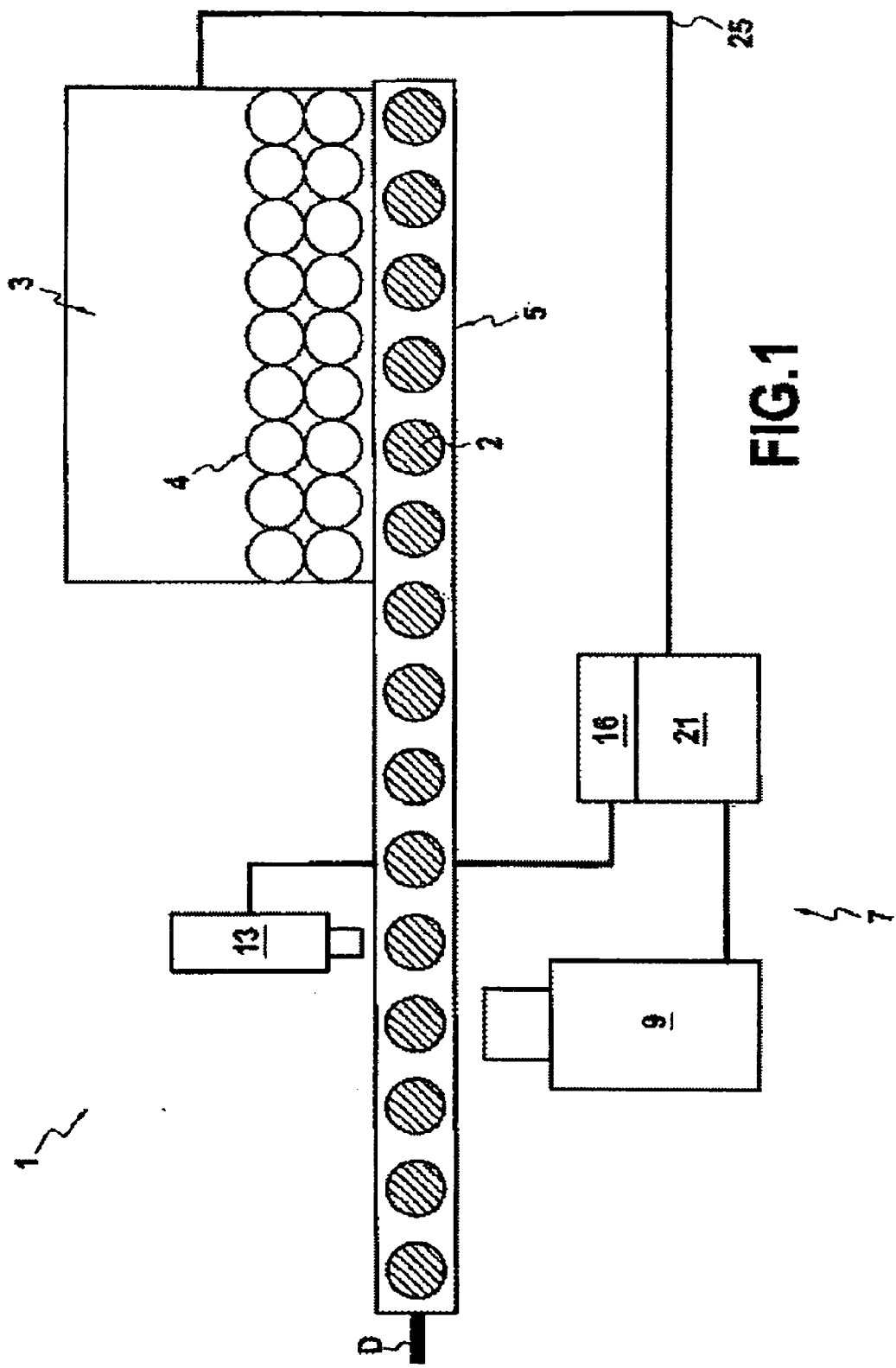
FIG. 1 is a schematic view illustrating an example of embodiment of a marking installation according to the invention.

The object of the invention concerns an installation 1 for the hot marking or etching of objects 2 e.g. transparent or translucent hollow objects such as glass bottles or flasks.

The installation 1 is positioned so as to ensure marking of the objects 2 leaving a manufacturing or forming machine 3, each object therefore being at high temperature. The forming machine 3, as is conventional, comprises a series of cavities 4, each ensuring the forming of an object 2. As is known, the objects 2 which have just been formed by the machine 3 form a line on an output conveyor 5 so that the objects 2 are lined up on the conveyor 5. The objects 2 are therefore conveyed one after the other to different processing stations in a direction of travel D of direction x. The objects are therefore moved in a plane defined by the axes x, y.

According to the invention, the installation 1 for hot-marking the objects 2 comprises a marking station 7 positioned as close as possible to the exit of the forming machine 3. The marking station 7 is therefore placed as close as possible to the forming machine 3 on the pathway of the conveyor 5 which therefore ensures successive travel of the hot temperature objects 2 in front of the marking station 7 in the direction of travel D.

The marking station 7 comprises an apparatus 9 to produce a laser beam 11. Said laser apparatus 9 is not described in further detail insofar as it is well known to the person skilled in the art.

Figure 2:
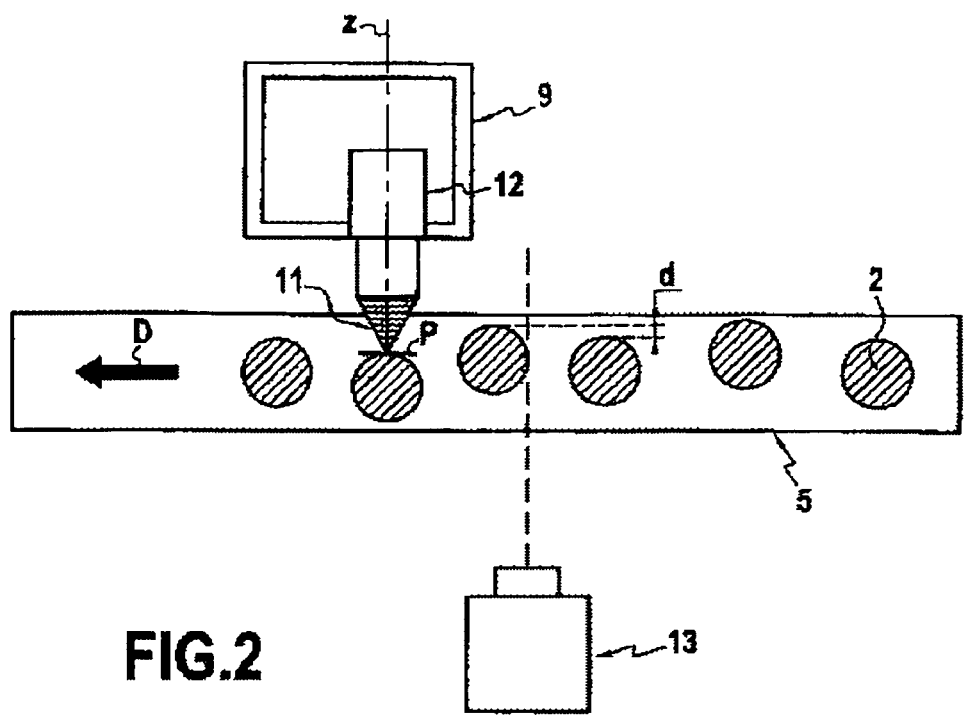
FIGS. 2 and 3 are overhead and perspective views respectively showing the characteristics of the installation conforming to the invention.
Figure 3:
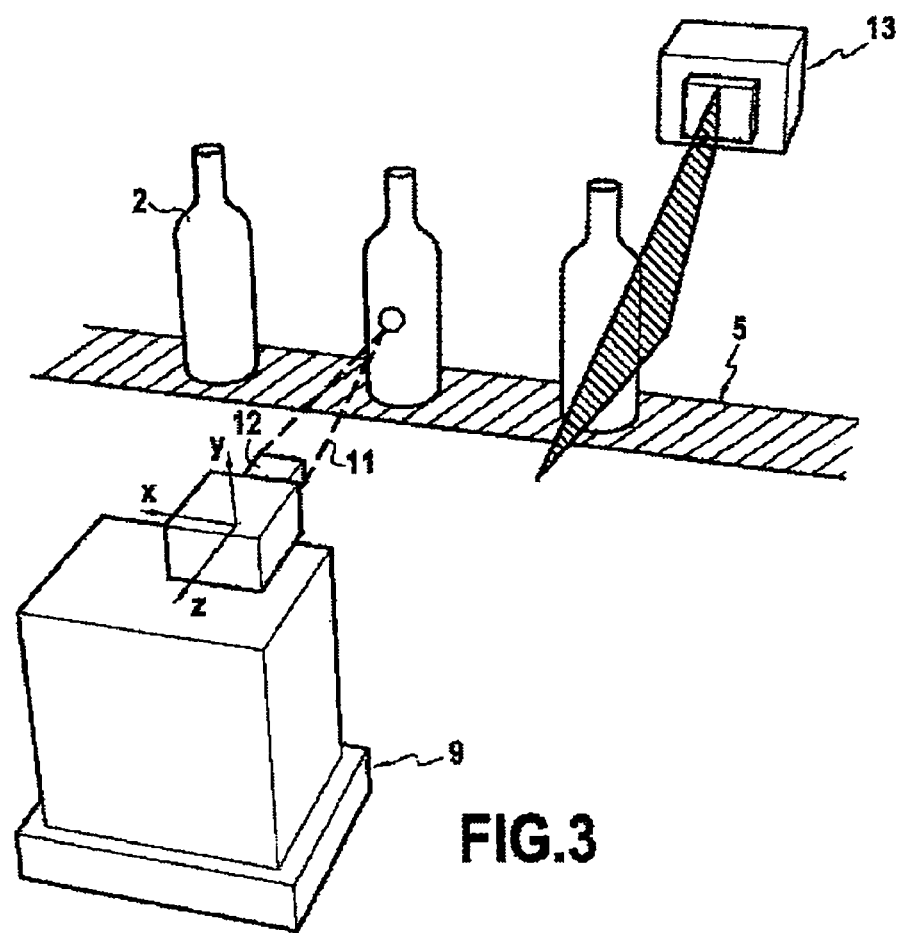

According to one advantageous characteristic of the invention illustrated more particularly in FIGS. 2 and 3, this apparatus 9 comprises means 12 to move the focusing plane P of the laser beam 11. In other words, the laser apparatus 9 comprises means to carry out optical corrections so as to move the position of the working plane P of the laser transversely with respect to the direction of travel D of the objects i.e. in the illustrated example, perpendicular to the plane defined by axes x, y. For example, the laser apparatus 12, as moving means 12, comprises a motorized optical system with guided movement.

In the illustrated example, the direction of the laser beam 11 is substantially perpendicular to the conveying direction D i.e. perpendicular to the plane defined by axes x, y. Evidently, it could be contemplated that the laser beam 11 has a transverse direction different from a perpendicular direction e.g. angled with respect to the conveying direction D. At all events, the means 12 ensure moving of the focusing plane P of the laser beam 11 in a transverse direction z relative to the conveying direction D i.e. in a direction z which cuts across this conveying direction D.

The installation 1 also comprises means 13 to determine the position of each of the objects 2 in at least one direction z transverse to the direction of travel D of the objects. In other words, these means 13 can detect the transverse shift of the objects with respect to the direction of travel D of the objects. The means 13 therefore allow determination of the position along axis z of each object 2 with respect to the laser apparatus 9.

According to one characteristic of the object of the invention, these determining means 13 are positioned upstream of the marking station relative to the direction of travel. In the example illustrated in FIGS. 2 and 3, the determining means 13 consist of an infrared camera of linear type arranged at a raised level on the side of the conveyor 5 so that it can measure the depth position of the objects on the conveyor. This camera is sensitive to infrared radiation emitted by the objects 2 still at high temperature after forming. The camera is arranged at a raised level with respect to the conveyor so as to form a nonzero angle relative to the horizontal. In addition, the field of the camera lies perpendicular to the direction of travel D of the objects. When the objects 2 are shifted on the conveyor 5 along axis z, their position changes in the camera's field. The camera 13 generates an output signal e.g. a video signal in response to the infrared radiation emitted by the objects 2.

Said camera 13 is linked to a control unit 16 which processes the output signals delivered by the camera. The images taken by the camera are analyzed by the unit during a processing step to determine the position of the objects 2 e.g. by triangulation. Evidently, the control and processing unit 16 is adapted to guide the functioning of the camera when an object 2 comes into its field of vision, so that the camera takes an image of each of the objects 2 travelling at fast rate.

The installation 1 also comprises means 21 used to guide the movement means 12 moving the laser apparatus 9. These guiding means 21 are linked to the means determining the position of the objects, namely the control unit which processes the output signals from the camera. These guide means 21 therefore allow the plane P of the laser beam to be focused in relation to the position of the objects to be marked, so that the laser beam is able to ensure proper marking of the objects when they pass in front of the apparatus 9.

The functioning of the installation 1 conforming to the invention follows directly from the preceding description. When the objects 2 pass in front of the camera 13, the objects 2 are detected and their position on the conveyor along axis z is measured. After the object has passed in front of the camera and before it passes in front of the laser apparatus 9, measurement of the object's position on the conveyor is transmitted to the guide means 21 which calculate any optical corrections that may need to be applied to the laser, and consequently guide the motorized optical system internal to the laser apparatus 9. The focal or working plane P of the laser beam is therefore adapted to the position of the object before it passes in front of the laser apparatus 9. The movement means 12 are such that the laser apparatus 9 works in a plane in which the laser beam has sufficient power to achieve melting or ablation of matter on the object 2 when it is marked. The movement means 12 therefore move the focusing plane P of the laser beam to achieve optimized marking of the object.

It is therefore to be appreciated that the method of the invention comprises a step, before the objects are marked, of determining the position of the objects in a direction z transverse to the direction of travel D of the objects, and a step to adapt the focusing plane P of the laser beam 11 in relation to the position of the objects to be marked so that, subsequently, the laser beam is able to ensure a marking operation on the objects passing in front of the laser beam 11. The marking operation is therefore ensured by the laser beam 11 whose focusing plane's P position has previously been optimized to ensure marking of the objects. It is to be noted that this process is implemented for each object travelling in front of the marking station 7. Evidently, the step to adapt the focusing plane P may be optional in the event that two consecutive objects occupy the same transverse position on the conveyor.

The object of the invention therefore sets out to act directly on the optics of the laser apparatus 9, to cause the focusing or work plane P of the laser beam to be controlled by the position of the objects 2 on the conveyor 5, in order to obtain sufficient laser intensity to achieve the marking operation. Evidently, it may be provided to move the laser apparatus 9 along axis z.

Evidently, it is possible to measure the position of the objects on the conveyor using various other methods. For example, an ultrasound, radar, capacitive or inductive system can be used which measures the direct distance between the sensor and the surface of the object. The measurements, that change as and when the objects 2 travel forward on the conveyor, are transmitted to the processing unit. Another technique consists of using a camera and a light source. In this technique, each object generates a contrast as it passes in front of the light source. The position of the object in the field of the camera is analyzed and is used to measure the position of the objects on the conveyor along axis z. Another method consists of using a laser transmitter and receiver which, by triangulation, can measure the direct distance between the sensor and the surface of the object.

According to another advantageous characteristic of the object of the invention, the installation 1 comprises synchronization means 25 between the control unit 21 and the forming machine 1 so that, for each object 2 passing in front of the marking station, it is known from which cavity each object derives. Therefore, position measurement and detection of the presence of the objects 2 is synchronized with the forming machine 1. In other words, for each cavity, an evaluation is made of the position on the conveyor of the object 2 derived from this cavity. Insofar as the installation is able to synchronize the laser apparatus 9 with the forming machine 3, it can be considered to produce a marking on each object which gives at least one data item related to the originating forming cavity. Therefore, provision may be made, for example, to mark the number of the mould or of the originating forming cavity.

It is to be noted that the marking station 7 can produce a marking on each object 2 which gives information on the forming machine for example, or on the production line and/or production factory.

Advantageously, the marking station 7 produces a marking on each object 2 giving at least one time information on the time of forming of the objects. For example, the marking station 7 can ensure time stamping using a data item such as date of manufacture, time of manufacture in hour, minutes, seconds.

According to another advantageous characteristic of embodiment, the marking station 7 produces on each object 2 a marking giving a unique identification to each of the objects. In other words, each object 2 carries a different code or mark from the other codes or marks carried by the other objects. This unique identification code may advantageously be obtained from either one of the other following data items: date, hour, minute, second of manufacture, mould or cavity number, reference of the forming machine, of the production line, of the production factory, etc.

It is to be noted that each marking can be produced alphanumerically or using a specific code that is directly legible or encrypted. For example, marking can be applied in the form of a data matrix code facilitating automatic re-reading operations.

The invention claimed is:

1. An installation for marking transparent or translucent objects leaving a forming machine (3), the objects successively travelling in translation in front of a marking station (7) comprising apparatus (9) to produce a laser beam (11) to ensure marking of the objects, characterized in that the installation comprises:
    means (13) to determine the position of each of the objects in at least one direction (z) transverse to the direction of travel (D) of the objects, and means (13) being positioned upstream of the marking station relative to the direction of travel,
    means (12) to move the focusing plane (P) of the laser beam, in a transverse direction (z) relative to the direction of travel (D),
    means (21) to guide the moving means (12) linked to the determining means which, in relation to the position of each object to be marked, allow the focusing plane (P) of the laser beam to be adapted to optimize marking of the objects by the laser beam (11).

2. The installation according to claim 1, characterized in that the installation further comprises means (25) to synchronize with the forming machine (3), linked to the marking station (7), so as to obtain marking on each object giving at least one item of information related to the forming cavity of each of the objects.

3. The installation according to claim 1, characterized in that the installation further comprises means (25) to synchronize with the forming machine (3), linked to the marking station (7), so that the marking station (7) produces marking on each object which gives at least one item of information related to the mould number or originating forming cavity of each of the objects.

4. The installation according to claim 1, characterized in that the installation further comprises means (25) to synchronize with the forming machine (3), linked to the marking station (7), so that the marking station (7) produces a marking on each object giving at least one time information related to the time of formation of the objects.

5. The installation according to claim 1, characterized in that the installation further comprises means (25) to synchronize with the forming machine (3), linked to the marking station (7), so that the marking station (7) produces a marking on each object giving at least one item of information related to the forming machine, the production line and/or the production factory.

6. The installation according to claim 1, characterized in that the installation further comprises means (25) to synchronize with the forming machine, (3) linked to the marking station (7), so that the marking station (7) produces marking on each object giving a unique identification for each of the objects.

7. The installation according to claim 1, characterized in that the means (13) to determine the position of the objects are optical means.

8. A marking method using a laser beam (11) at the exit of a forming machine (3), to mark transparent and/or translucent objects (2) successively travelling in translation in front of a marking station (7), characterized in that the method comprises the following steps:
- before marking, determining the position of each object in at least one transverse direction (z) relative to the direction of travel (D) of the objects,
- moving the focusing plane (P) of the laser beam in the transverse direction (z) relative to the position of these objects to be marked, to optimize the subsequent marking operation of the objects travelling in front of the laser beam,
- producing a marking on each object by means of the laser beam (11) whose focusing plane has been optimally positioned to ensure marking.

9. The method according to claim 8, characterized in that the method consists of synchronizing the marking station (7) with the machine (3) forming the objects, so that marking is obtained on each object giving at least one item of information related to the forming cavity of each of the objects.

10. The method according to claim 8, characterized in that the method consists of synchronizing the marking station (7) with the machine (3) forming the objects, so that marking is produced on each object giving a unique identification for each object.

11. The method according to claim 8, characterized in that the method consists of synchronizing the marking station (7) with the machine (3) forming the objects, so as to obtain marking on each object based on at least one of the following data items: mould number or originating cavity, forming machine, production line, production factory, date of manufacture.

12. The method according to claim 8, characterized in that the method consists of producing coded marking on each object.

13. An installation, at the exit of a forming machine (3) to mark transparent or translucent objects successively travelling in translation in front of a marking station (7) comprising an apparatus (9) to produce a laser beam (11) to ensure marking of the objects, characterized in that the installation comprises means (25) to synchronize with the forming machine (3), linked to the marking station (7), so that the marking station (7) produces marking on each object giving a unique identification for each of the object, obtained from at least one data item related to the mould number and/or originating forming cavity of each object.

14. The installation according to claim 13, characterized in that the installation further comprises means (25) to synchronize with the forming machine (3), linked to the marking station (7), so that the marking station (7) produces marking on each object giving at least one time information related to the time of formation of the objects.

15. The installation according to claim 13, characterized in that the installation comprises means (52) to synchronize with the forming machine (3), linked to the marking station (7), so that the marking station (7) produces marking on each object giving at least one item of information related to the forming machine, the production line and/or production factory.

16. A method using a laser beam (11) at the exit of a forming machine (3) to mark transparent or translucent objects (2) successively travelling in translation in front of a marking station (7), characterized in that the method consists of synchronizing the marking station (7) with the machine (3) forming the objects so as to produce a marking on each object, giving a unique identification to each object obtained from at least one data item related to the mould number and/or forming cavity of each of the objects.

17. The method according to claim 16, characterized in that the method consists of synchronizing the marking station (7) with the machine (3) forming the objects, so as to produce a marking on each object from at least one of the following data items: mould number or number of originating cavity, forming machine, production line, production factory, date of manufacture.

18. The method according to claim 16, characterized in that the method consists of producing a coded marking on each object.

* * * * *